(12) United States Patent
Prakash et al.

(10) Patent No.: US 10,726,824 B2
(45) Date of Patent: Jul. 28, 2020

(54) COMPOSITE SOUND ABSORPTION PANEL ASSEMBLY

(71) Applicant: THE BOEING COMPANY, Chicago, IL (US)

(72) Inventors: Om Prakash, Bengaluru (IN); Shantanu Bhattacharya, Kanpur (IN); Sanjay Kumar, Kanpur (IN); Pulak Bhushan, Kanpur (IN)

(73) Assignee: THE BOEING COMPANY, Chicago, IL (US)

( * ) Notice: Subject to any disclaimer, the term of this patent is extended or adjusted under 35 U.S.C. 154(b) by 330 days.

(21) Appl. No.: 15/719,854

(22) Filed: Sep. 29, 2017

(65) Prior Publication Data

US 2019/0103089 A1     Apr. 4, 2019

(51) Int. Cl.
*G10K 11/172* (2006.01)
*B32B 7/12* (2006.01)
(Continued)

(52) U.S. Cl.
CPC .............. *G10K 11/172* (2013.01); *B32B 3/12* (2013.01); *B32B 3/266* (2013.01); *B32B 7/02* (2013.01);
(Continued)

(58) Field of Classification Search
CPC ......... G10K 11/172; B32B 3/12; B32B 3/266; B32B 7/02; B32B 7/12; B32B 15/043;
(Continued)

(56) References Cited

U.S. PATENT DOCUMENTS 3,380,206 A     4/1968   Barnett
4,294,329 A     10/1981  Rose et al.
(Continued)

FOREIGN PATENT DOCUMENTS

EP     0509166 A1     10/1992
EP     3135949 A1     3/2017
GB     2066730 A      7/1981

OTHER PUBLICATIONS

Extended European Search Report for corresponding European Application No. 18196779.5-1107 dated Jan. 28, 2019 (5 pages).
(Continued)

*Primary Examiner* — Forrest M Phillips
(74) *Attorney, Agent, or Firm* — The Small Patent Law Group LLC; Philip S. Hof (57) ABSTRACT

A composite panel assembly includes first and second elastic membranes and a structure. The structure has a first side mounted to the first elastic membrane and a second side mounted to the second elastic membrane. The structure includes a first honeycomb layer, a second honeycomb layer, and a plurality of necks. The first honeycomb layer has partition walls defining resonance cavities that are covered by the first elastic membrane along the first side. The second honeycomb layer has partition walls defining resonance cavities that are covered by the second elastic membrane along the second side. The necks are disposed between and connect the first and second honeycomb layers. Each neck defines a channel that is fluidly connected to a corresponding one of the resonance cavities of the first honeycomb layer and a corresponding one of the resonance cavities of the second honeycomb layer.

20 Claims, 5 Drawing Sheets

(51) Int. Cl.

| | | |
|---|---|---|
| *B32B 25/14* | (2006.01) | |
| *B32B 3/12* | (2006.01) | |
| *B32B 15/088* | (2006.01) | |
| *B32B 25/08* | (2006.01) | |
| *B32B 15/04* | (2006.01) | |
| *B32B 25/12* | (2006.01) | |
| *B32B 27/34* | (2006.01) | |
| *B32B 15/06* | (2006.01) | |
| *B32B 27/08* | (2006.01) | |
| *B32B 3/26* | (2006.01) | |
| *B32B 7/02* | (2019.01) | |
| *B32B 25/04* | (2006.01) | |
| *B32B 37/12* | (2006.01) | |
| *B64C 1/40* | (2006.01) | |
| *B64C 1/00* | (2006.01) | |

(52) U.S. Cl.
CPC .............. *B32B 7/12* (2013.01); *B32B 15/043* (2013.01); *B32B 15/06* (2013.01); *B32B 15/088* (2013.01); *B32B 25/042* (2013.01); *B32B 25/08* (2013.01); *B32B 25/12* (2013.01); *B32B 25/14* (2013.01); *B32B 27/08* (2013.01); *B32B 27/34* (2013.01); *B32B 37/12* (2013.01); *B32B 2250/04* (2013.01); *B32B 2250/24* (2013.01); *B32B 2250/40* (2013.01); *B32B 2270/00* (2013.01); *B32B 2307/102* (2013.01); *B32B 2319/00* (2013.01); *B32B 2605/08* (2013.01); *B32B 2605/10* (2013.01); *B32B 2605/12* (2013.01); *B32B 2605/18* (2013.01); *B32B 2607/00* (2013.01); *B64C 1/40* (2013.01); *B64C 2001/0072* (2013.01)

(58) Field of Classification Search
CPC ..... B32B 15/06; B32B 15/088; B32B 25/042; B32B 25/08; B32B 25/12; B32B 25/14; B32B 27/08; B32B 27/34; B32B 27/12; B32B 2250/04; B32B 2250/24; B32B 2250/40; B32B 2270/00; B32B 2307/102; B32B 2319/00; B32B 2605/08; B32B 2605/10; B32B 2605/12; B32B 2605/18; B32B 2607/00; B64C 1/40; B64C 2001/0072
USPC ........................................................ 181/292
See application file for complete search history.

(56) References Cited

U.S. PATENT DOCUMENTS

| | | | | |
|---|---|---|---|---|
| 5,241,512 | A * | 8/1993 | Argy | G10K 11/172 181/198 |
| 6,536,556 | B2 * | 3/2003 | Porte | B32B 3/12 181/284 |
| 8,616,330 | B1 * | 12/2013 | McKnight | G10K 11/16 181/207 |
| 9,284,727 | B2 * | 3/2016 | McKnight | G10K 11/172 |
| 2002/0070077 | A1 * | 6/2002 | Porte | G10K 11/172 181/292 |
| 2004/0163888 | A1 * | 8/2004 | Johnson | B64D 29/00 181/292 |
| 2011/0073407 | A1 | 3/2011 | Ayle | |
| 2014/0202789 | A1 * | 7/2014 | Heurtaux | G10K 11/172 181/292 |
| 2015/0041248 | A1 * | 2/2015 | Ichihashi | E04B 1/84 181/292 |
| 2015/0290920 | A1 | 10/2015 | Braden et al. | |
| 2016/0027427 | A1 * | 1/2016 | Yang | G10K 11/172 181/286 |

OTHER PUBLICATIONS

Ozcan et al.; "In Cabin Noise Levels During Commercial Aircraft Flights" Canadian Acoustics (2006); vol. 34, No. 4; 5 pages.
Wibly; "Aircraft Interior Noise" Journal of Sound and Vibration (1996); 190(3); 20 pages.
U.S. Department of Health and Human Services; "Occupational Noise Exposure" Criteria for a Recommended Standard (1998); 126 pages.
Yang et al.; "Acoustic Metamaterial Panels for Sound Attenuation in the 50-1000Hz Regime" Applied Physics Letters (2010); 96(4): 041906; 3 pages.
Sheng; "Dynamic Mass Density and Acoustic Metamaterials" Department of Physics, Hong Kong University of Science and Technology; 2 pages.
Haberman et al.; "Acoustic Metamaterials" Physics Today (2016); 69(6); 8 pages.
Burov et al.; Acoustic Double-Negative Media Acoustical Physics (2009); vol. 55, No. 3; 13 pages.
Liu et al.; "Locally Resonant Sonic Materials" Science (2000); vol. 289; 4 pages.
Yang et al.; "Membrane-Type Acoustic Metamaterial with Negative Dynamic Mass" Physical Review Letters (2008); 101(20), 204301; 4 pages.
Lee et al.; "Acoustic Metamaterial with Negative Density" Physics Letters A (2009); 373(48): 4464-4469; 6 pages.
Ma et al.; "Acoustic Metasurface with Hybrid Resonances" Nature Materials (2014); 13(9); 6 pages.
Wang et al.; "Membrane-Constrained Acoustic Metamaterials for Low Frequency Sound Insulation" Applied Physicss Letters (2016); 108, 041905; 6 pages.
Mei et al.; "Dark Acoustic Metamaterials as Super Absorbers for Low-Frequency Sound" Nature Communications (2012); 3:756; 7 pages.
Fang et al.; "Ultrasonic Metamaterials with Negative Modulus" Nature Materials (2006); vol. 5, No. 6; 5 pages.
Lee et al.; "Acoustic Metamaterial with Negative Modulus" Journal of Physics: Condensed Matter (2009); 21(17); 8 pages.
Hu et al.; "Two-Dimensional Sonic Crystals with Helmholtz Resonators" Physical Review E (2005); 71(5), 055601; 4 pages.
Fey et al.; "Compact Acoustic Bandgap Material Based on a Subwavelength Collection of Detuned Helmholtz Resonators" (2011); 109, 114903; 5 pages.
Shen et al.; "Side Branch-Based Acoustic Metamaterials with a Broad-Band Negative Bulk Modulus" Applied Physics A. (2014); 117(4); 7 pages.
Jing et al.; "Soft Resonator of Omnidirectional Resonance for Acoustic Metamaterials with a Negative Bulk Modulus" Scientific Reports (2015) 5: 16110; 8 pages.
Ding et al.; "Two-Dimensional Acoustic Metamaterial with Negative Modulus" Journal of Applied Physics (2010) 102, 074911; 6 pages.
Li et al.; "Double-Negative Acoustic Metamaterial" Physical Review E (2004); 70, 055602; 4 pages.
Lee et al.; "Composite Acoustic Medium with Simultaneously Negative Density and Modulus" Physical Review Letters (2010); 104, 054301; 4 pages.
Wu et al.; "Elastic Metamaterials with Simultaneously Negative Effective Shear Modulus and Mass Density" Physical Review Letters (2011); 107(10): 105506; 18 pages.
Cheng et al.; "Ultra-Sparse Metasurface for High Reflection of Low-Frequency Sound Based on Artificial Mie Resonances" Nature Materials (2015); vol. 14; 8 pages.
Ding et al.; "Metamaterial with Simultaneously Negative Bulk Modulus and Mass Density" Physical Review Letters (2007); 99, 093904; 4 pages.
Zeng et al.; "Flute-Model Acoustic Metamaterials with Simultaneously Negative Bulk Modulus and Mass Density" Solid State Communications (2013); 173; 11 pages.
Yang et al.; Coupled Membranes with Doubly Negative Mass Density and Bulk Modulus; Physical Review Letters (2013); 110, 134301; 5 pages.

(56) References Cited

OTHER PUBLICATIONS

Jing et al.; "Numerical Study of a Near-Zero-Index Acoustic Metamaterial" Physical Letters A (2012); 376(45); 13 pages.
Hartmann et al.; "Springer Handbook of Acoustics" Thomas D. Rossing (Ed.) Springer (2007); 43 pages.
Ma et al.; Acoustic Metamaterials: From Local Resonances to Broad Horizons; Science Advances (2016); 2(2): e1501595; 17 pages.
Sui et al.; "A Lightweight Yet Sound-Proof Honeycomb Acoustic Metamaterial" Applied Physics Letters (2015); 106, 171905; 5 pages.

* cited by examiner

COMPOSITE SOUND ABSORPTION PANEL ASSEMBLY

FIELD

Embodiments of the present disclosure generally relate to composite sound-absorbing panel assemblies, and, more particularly, to acoustic structures configured to absorb sound at tunable frequency ranges to dampen noise within, for example, interior cabins of vehicles, such as aircraft.

BACKGROUND

Sound-absorbing materials are desirable in various vehicles and facilities with people present because exposure to high noise levels can cause hearing loss, increase stress, and interfere with communication. Some current types of noise dampening materials include active noise cancelling piezo-electric materials and passive foams and foam-like materials, but each has associated disadvantages. For example, weight and space are concerns for the passive foam materials, which are typically relatively heavy and voluminous. Heavy foam installed within certain vehicles, such as aircraft, may result in increased fuel consumption and reduced operating efficiency. Another disadvantage of passive foam materials is that the materials are typically not designed to absorb sound at frequency ranges of interest that are specific to a certain application. The piezo-based systems may be smaller and/or lighter than the foams, but require hardware, such as electrical components, circuitry, and power supplies. The piezo-based systems are generally more complex and costly to manufacture, install, operate, troubleshoot, and repair than the passive foams, and reliability of the systems can also be an issue.

SUMMARY

A need exists for a sound-absorbing panel that effectively dampens noise within a frequency range of interest and can be installed in a vehicle, such as an aircraft. A need exists for an efficient way of constructing such a sound-absorbing panel.

With those needs in mind, certain embodiments of the present disclosure provide a composite panel assembly configured to absorb sound. The panel assembly includes first and second elastic membranes and a structure (e.g., an acoustic meta-structure). The structure has a first side and a second side that is opposite the first side. The first side is mounted to the first elastic membrane. The second side is mounted to the second elastic membrane. The structure includes a first honeycomb layer, a second honeycomb layer, and a plurality of necks. The first honeycomb layer has partition walls defining resonance cavities that are covered by the first elastic membrane along the first side of the structure. The second honeycomb layer has partition walls defining resonance cavities that are covered by the second elastic membrane along the second side of the structure. The necks are disposed between and connect the first and second honeycomb layers. Each neck defines a channel that is fluidly connected to a corresponding one of the resonance cavities of the first honeycomb layer and a corresponding one of the resonance cavities of the second honeycomb layer.

In at least one embodiment, the resonance cavities of the first and second honeycomb layers are hexagonal cavities, and each hexagonal cavity is defined by six partition walls.

Optionally, the length of the partition walls between adjacent partition walls is between about 1 mm and about 6 mm.

In one or more embodiments, each of the first honeycomb layer and the second honeycomb layer includes a respective base wall that defines inner ends of the respective resonance cavities. The necks extend between and connect the two base walls of the first and second honeycomb layers. Each of the base walls defines orifices therethrough that align with the channels of the necks to fluidly connect the resonance cavities of the first honeycomb layer to the resonance cavities of the second honeycomb layer through the channels.

In at least one embodiment, a thickness of each of the first and second elastic membranes between an interior surface and an exterior surface is between about 0.1 mm and about 1.0 mm. The necks may each have a length that is between about 0.2 mm and about 2 mm. The structure may have a height between the first side and the second side that is between about 5 mm and about 30 mm.

Certain embodiments of the present disclosure provide a method of producing a composite sound-absorbing panel assembly that includes forming a structure that has a first side and a second side that is opposite to the first side. The structure includes a first honeycomb layer with partition walls defining resonance cavities, a second honeycomb layer with partition walls defining resonance cavities, and a plurality of necks disposed between and connecting the first and second honeycomb layers. Each of the necks defines a channel that is fluidly connected to a corresponding one of the resonance cavities of the first honeycomb layer and a corresponding one of the resonance cavities of the second honeycomb layer. The method includes mounting a first elastic membrane to the first side of the structure. The first elastic membrane covers outer ends of the resonance cavities of the first honeycomb layer. The method also includes mounting a second elastic membrane to the second side of the structure. The second elastic membrane covers outer ends of the resonance cavities of the second honeycomb layer.

Certain embodiments of the present disclosure provide a composite panel assembly configured to absorb sound. The panel assembly includes a structure having multiple unit modules disposed side by side. Each of the unit modules includes a first base wall and multiple first partition walls extending from the first base wall to define a first resonance cavity. The first base wall defines an inner end of the first resonance cavity. Each unit module also has a second base wall and multiple second partition walls extending from the second base wall to define a second resonance cavity. The second base wall defines an inner end of the second resonance cavity. The second base wall is spaced apart from the first base wall. Each unit module includes a neck extending between and connecting the first and second base walls. The neck defines a channel therethrough that is fluidly connected to the first resonance cavity through an orifice in the first base wall and is fluidly connected to the second resonance cavity through an orifice in the second base wall.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a scalable composite panel assembly for sound-absorption that can be used within a vehicle, such as a commercial aircraft, as well as within various facilities, such as manufacturing plants, factories, offices, and the like. The composite panel assemblies of the embodiments described herein may be produced in the form of tiles, films, wall panels, or the like, and can be selectively sized to cover desired areas for noise dampening.

The composite panel assembly described in one or more embodiments herein has a structural architecture that includes an acoustic meta-structure disposed between two elastic membranes. The term "acoustic meta-structure" refers to a structure that is designed to passively control, direct, and manipulate sound waves that impinge upon the structure based on the specific architecture of the structure. The acoustic meta-structure may include twin layers of honeycomb-shaped cavities, and the cavities in the two layers are interconnected through small channels within neck portions of the meta-structure. Each of the two elastic membranes extends across and covers the honeycomb-shaped cavities of a different one of the layers. When exposed to sound waves, the membranes vibrate, moving into and out of the honeycomb-shaped cavities. In addition, partition walls of the meta-structure that define the cavities may bend and flex due to the vibrational energy. The honeycomb-shaped cavities in the twin layers function as resonance chambers, and the interconnecting channels between two cavities allow the meta-structure to represent a dual Helmholtz resonator.

The embodiments of the composite panel assembly described herein can have parameters that are tuned to provide certain desired acoustic properties. For example, the composite panel assembly may provide relatively high sound transmission loss at a frequency range of interest, such as at low frequencies (e.g., 25-500 Hz) present within interior cabins of aircraft and/or at higher frequencies. The composite panel assembly may be configured such that there is a first range of frequencies in which the panel assembly has a negative bulk modulus, and a second range of frequencies in which the panel assembly has a negative mass density. The first and second frequency ranges may overlap to define a "double negative" frequency range in which both the bulk modulus and the mass density are negative. The composite panel assembly demonstrates high sound transmission loss and a high absorption coefficient in desirable frequency ranges.

In one or more embodiments, the composite sound-absorbing panel assembly can be produced via relatively cost efficient and simple manufacturing methods. For example, the acoustic meta-structure can be assembled via an additive manufacturing process, such as 3D printing or the like, using one or more polymeric materials. The membranes can then be bonded to opposite first and second sides of the meta-structure. The manufacturing process is highly scalable and the resulting panel assembly can be used in large area noise shielding applications. For example, the panel assembly can be placed on walls within an interior cabin of an aircraft, within an engine compartment of an aircraft to surround the engine (e.g., cowl, nacelle, and the like), or other locations in which sound or vibrations may be undesired. The panel assembly optionally may be constructed using heat-resistant materials.

Additionally, the panel assemblies may be made to have an application-specific thickness without significantly affecting the sound absorbing properties of the panels. Thus, the thickness of the panel assembly may be selectable within a given range, such as between about 3 mm and about 30 mm. The relatively large range of allowable thicknesses provides options in how the composite panel assembly is implemented within an application. For example, the composite panel assembly may be formed as interconnecting panels, as tiles, or as a film or coating that is applied onto a flat surface (e.g., similar to wallpaper).

Figure 1:
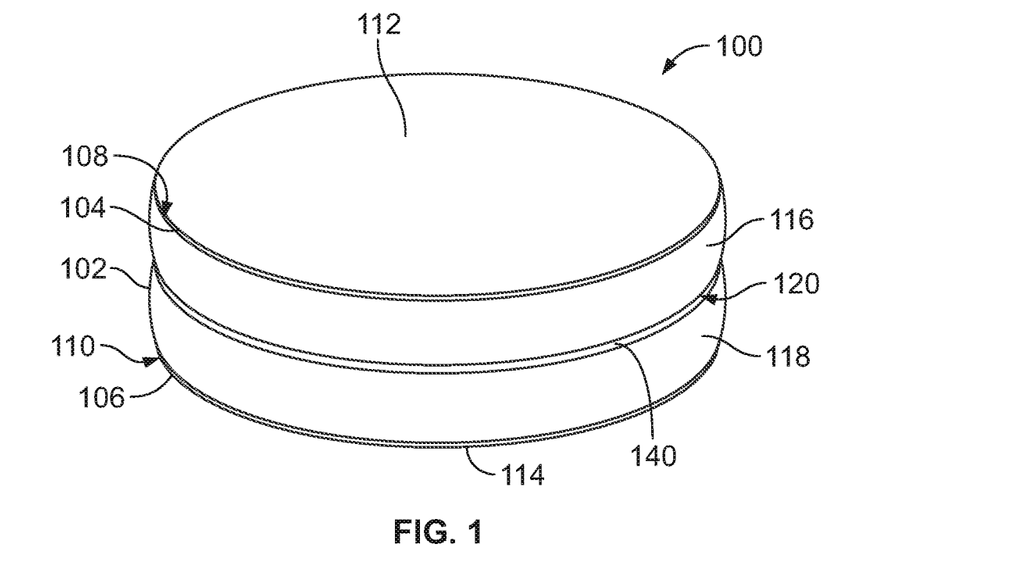
FIG. 1 is a top perspective view of a composite sound-absorbing panel assembly according to an embodiment of the present disclosure.

FIG. 1 is a top perspective view of a composite sound-absorbing panel assembly 100 according to an embodiment of the present disclosure. The composite sound-absorbing panel assembly 100 is referred to herein as composite panel 100 and panel 100. The panel 100 includes an acoustic meta-structure 102 sandwiched between a first elastic membrane 104 and a second elastic membrane 106.

The acoustic meta-structure 102, also referred to herein simply as structure 102 or meta-structure 102, has top side 108 and a bottom side 110 that is opposite to the top side 108. The top side 108 is mounted to the first elastic membrane 104. The bottom side 110 is mounted to the second elastic membrane 106. The top side 108 may be referred to as a first side or a second side, and the bottom side 110 may be referred to as a second side or a first side.

While various spatial and directional terms, such as "top," "bottom," "upper," "lower," "vertical," and the like may be used to describe embodiments of the present disclosure, it is understood that such terms are merely used with respect to the orientations shown in the drawings. The orientations may be inverted, rotated, or otherwise changed, such that the top side 108 becomes a bottom side if the meta-structure 102 is flipped 180 degrees, becomes a left side or a right side if the meta-structure 102 is pivoted 90 degrees, and the like.

The panel 100 has a height extending from an exterior surface 112 of the first elastic membrane 104 to an exterior surface 114 of the second elastic membrane 106. The exterior surfaces 112, 114 of the membranes 104, 106 face away from each other. In the illustrated embodiment, the panel 100 has a round disc-shape, as the first and second elastic membranes 104, 106 are generally planar. Optionally, the panel 100 may be formed into various other shapes in other embodiments, such as rectangular or square tiles, sheets, films, or the like.

Figure 2:
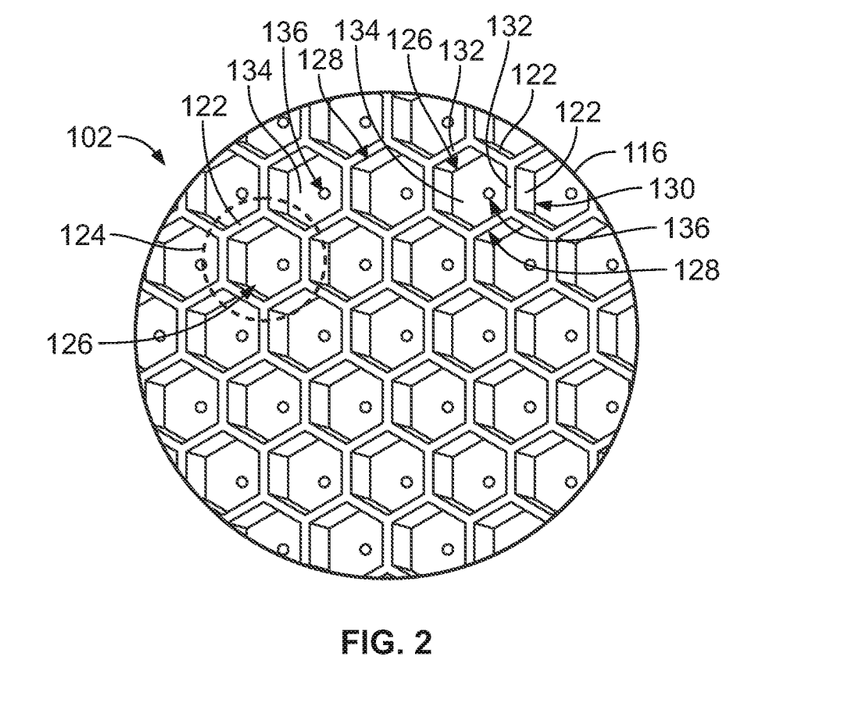
FIG. 2 is a perspective top-down view of an acoustic meta-structure of the composite panel assembly according to an embodiment of the present disclosure.

The meta-structure 102 includes an upper honeycomb layer 116, a lower honeycomb layer 118, and an intermediate space 120 therebetween. Each of the upper and lower honeycomb layers 116, 118 represents a lattice of interconnected cells distributed in a two-dimensional plane, as shown in FIG. 2. The upper honeycomb layer 116 is spaced apart from the lower honeycomb layer 118 by the intermediate space 120. The upper honeycomb layer 116 is physically connected to the lower honeycomb layer 118 via interconnecting necks 206 (shown in FIG. 3) that extend across the intermediate space 120. The upper honeycomb layer 116 may be referred to as a first honeycomb layer or a second honeycomb layer, and the lower honeycomb layer 118 may be referred to as a second honeycomb layer or a first honeycomb layer.

FIG. 2 is a perspective top-down view of the meta-structure 102 of the panel 100 according to an embodiment. The first elastic membrane 104 is omitted to show the upper honeycomb layer 116 (also referred to herein simply as upper layer 116) of the meta-structure 102 in detail. The upper layer 116 has partition walls 122 that define a honeycomb-like lattice of interconnected cells 124. The upper layer 116 is also referred to herein as an upper honeycomb layer 116. The cells 124 are arranged side-by-side in a two-dimensional plane. For example, each cell 124 extends a full height of the upper layer 116 between the first elastic membrane 104 and the intermediate space 120 (shown in FIG. 1). Each cell 124 includes a respective resonance cavity 126 that is defined between the partition walls 122 of the cell 124. In the illustrated embodiment, many of the partition walls 122 extend between and define portions of two cavities 126 of adjacent cells 124. The resonance cavities 126 in the illustrated embodiment are hexagonal cavities that are each defined by six partition walls 122. Optionally, the resonance cavities 126 may have different numbers of sides in other embodiments. For example, at least some of the cavities 126 may be pentagonal or octagonal in other embodiments. The partition walls 122 of the upper layer 116 may be referred to as first partition walls or second partition walls.

The resonance cavities 126 each extend between an outer end 128 and an inner end 130 opposite to the outer end 128. The outer ends 128 of the resonance cavities 126 are located at distal edges 132 of the partition walls 122. With additional reference to FIG. 1, the distal edges 132 of the partition walls 122 define the top side 108 of the meta-structure 102. The inner ends 130 of the resonance cavities 126 are proximate to the intermediate space 120. The resonance cavities 126 are open at the outer ends 128. When assembled into the panel 100 shown in FIG. 1, the first elastic membrane 104 covers the outer ends 128 of the resonance cavities 126 of the upper layer 116, enclosing and sealing the cavities 126.

The upper honeycomb layer 116 includes a base wall 134 that defines the inner ends 130 of the resonance cavities 126. The partition walls 122 are coupled to the base wall 134 and extend vertically from the base wall 134 to the distal edges 132. The base wall 134 generally encloses the inner ends 130 of the cavities 126, except for small orifices 136 that extend through the base wall 134. Each orifice 136 aligns with a different one of the resonance cavities 126. Each cavity 126 is fluidly connected to a single orifice 136 in the base wall 134 such that air may pass to and through the orifice 136. Alternatively, more than one orifice 136 may align with at least some of the resonance cavities 126, or some resonance cavities 126 may not align with any orifices 136 in the base wall 134.

The lower honeycomb layer 118 (also referred to herein simply as lower layer 118) that is shown in FIG. 1 may be identical, or at least substantially similar, in design, size, and shape as the upper layer 116, such that the lower layer 118 is also a honeycomb lattice of interconnected cells. The lower layer 118 mirrors the upper layer 116. For example, the intermediate space 120 (FIG. 1) is defined between the base wall 134 of the upper layer 116 and a base wall 140 (FIG. 1) of the lower layer 118. Additional details of the lower honeycomb layer 118 are provided herein with reference to FIGS. 3 and 4.

Figure 3:
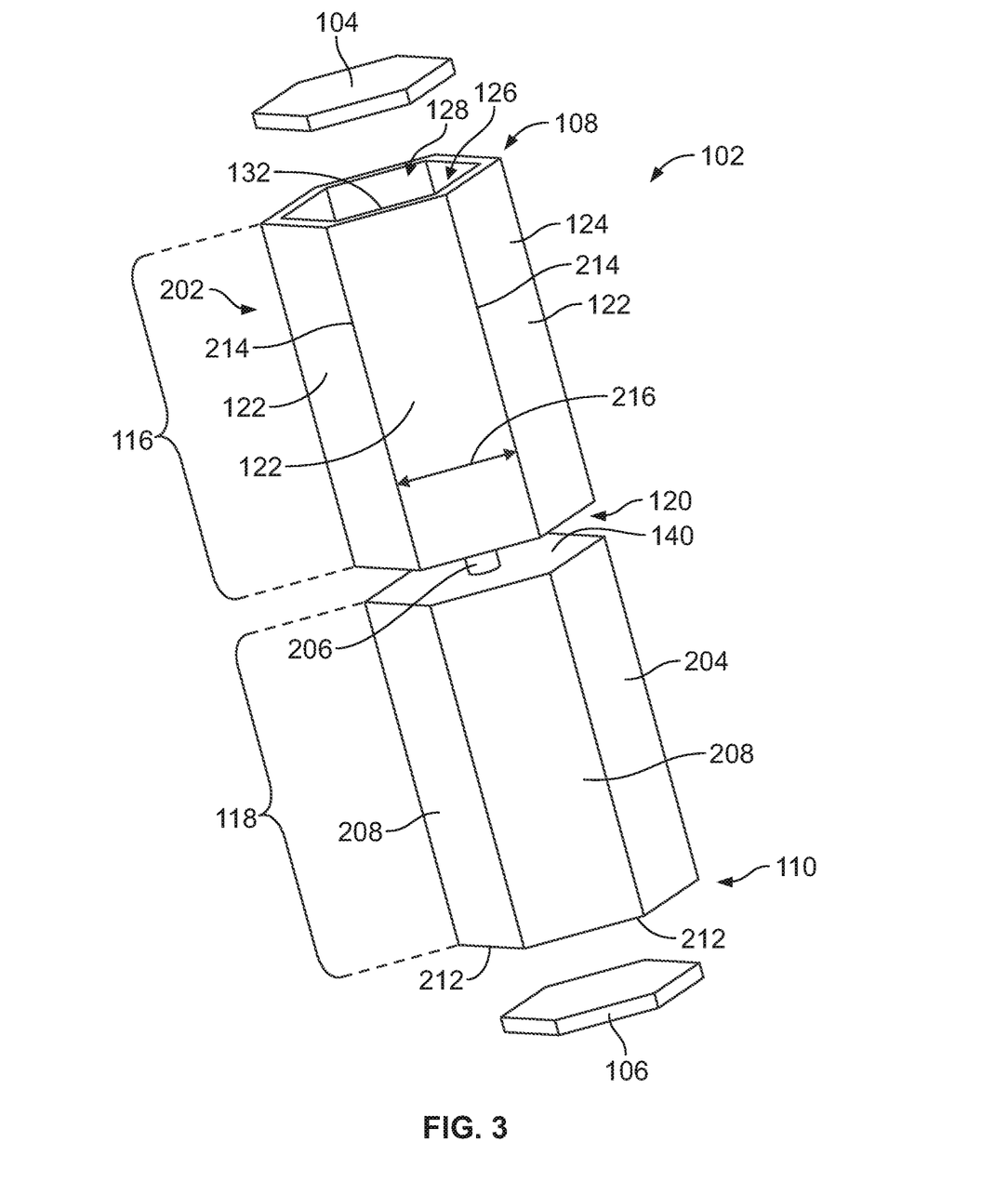
FIG. 3 is an exploded perspective view of a unit module of the acoustic meta-structure and portions of first and second elastic membranes that align with the unit module according to an embodiment of the present disclosure.

FIG. 3 is an exploded perspective view of a unit module 202 of the meta-structure 102 and portions of the first and second elastic membranes 104, 106 that align with the unit module 202 according to an embodiment. The unit module 202 of the meta-structure 102 includes one cell 124 of the upper layer 116, one cell 204 of the lower layer 118, and a neck 206 interconnecting the two cells 124, 204. The cell 204 of the lower layer 118 has an identical, or at least substantially similar, design, size, and shape as the cell 124. For example, two components are considered as "identical" herein if the two components are intended to have the same design, shape, and size, even though the identical components may have different blemishes or imperfections. The cell 204 includes partition walls 208 that define a resonance cavity 210 (shown in FIG. 4). The cell 204 mirrors the cell 124 on opposite ends of the neck 206. The partition walls 208 of the lower layer 118 may be referred to as second partition walls or first partition walls.

The unit module 202 extends the full height of the meta-structure 102 between the top and bottom sides 108, 110. For example, distal edges 212 of the partition walls 208 define a portion of the bottom side 110 of the meta-structure 102.

The unit module 202 is a structure that is repeated many times within the meta-structure 102. For example, the meta-structure 102 may be formed by tessellating, or replicating, the unit module 202 side-by-side in a two-dimensional plane. The unit module 202 is illustrated as a discrete, unitary structure in FIG. 3 for descriptive purposes, but, as shown in FIG. 2, the cell 124 of the unit module 202 may be integrally connected to adjacent cells 124 in the upper layer 116. For example, although not shown in FIG. 3, there may be additional partition walls 122 that extend outward (away from the resonance cavity 126) at the corners 214 between adjacent partition walls 122 of the cell 124. Likewise, the cell 204 of the unit module 202 may be integrally connected to adjacent cells (not shown) in the lower layer 118.

The neck 206 is connected to each of the cells 124, 204 and extends between the cells 124, 204 across the intermediate space 120. For example, the neck 206 is coupled to the base wall 140 of the lower cell 204 and the base wall 134 (shown in FIG. 2) of the upper cell 124. As shown in FIG. 3, the neck 206 has a smaller diameter than the cells 124, 204. The volume of the intermediate space 120 between the cells 124, 204 surrounding the neck 206 is occupied by air or another fluid.

The meta-structure 102 in a non-limiting embodiment is composed of a polymeric material, such as one or more plastics or other polymers. In one example, the meta-structure 102 is composed of a polyamide material. The meta-structure 102 in other embodiments may be composed of other materials, such as metallic materials, composite materials, ceramics, or the like. For example, constructing the meta-structure 102 using ceramics or other heat-resistant materials may allow the meta-structure 102 to be installed at a high-temperature environment, such as near an engine of an aircraft.

The first and second elastic membranes 104, 106 may be composed of a rubber material. The term "rubber material" as used herein is inclusive of both natural rubber and synthetic, rubber-like materials. The membranes 104, 106 are configured to oscillate relative to the meta-structure 102 due to sound waves and/or other pressure fluctuations. In other embodiments, the elastic membranes 104, 106 may be composed of materials other than rubber materials, such as a metallic material, a composite material, or the like.

In an embodiment, the neck 206 is integrally connected to both the upper cell 124 and the lower cell 204. Thus, there may not be a seam at interfaces between the neck 206 and the base walls 134, 140 of the upper and lower cells 124, 204 that could be attributable to a connection interface. In one or more embodiments, the meta-structure 102 is produced via an additive manufacturing process, such as 3D printing, vapor fusion deposition, or the like. In the additive manufacturing process, the upper cells 124 of the upper layer 116, the lower cells 204 of the lower layer 118, and the necks 206 are formed during a common manufacturing process. The upper layer 116, the lower layer 118, and the necks 206 are formed integral with each other during the additive manufacturing process. Alternatively, the upper layer 116, the lower layer 118, and necks 206 are each formed as separate and discrete components in different processes, and the integral connection between the components may be accomplished by permanently bonding the components to one another after formation, such as through pasting, welding, or brazing. For example, the upper and lower layers 116, 118 may each be formed via an additive manufacturing process, and the necks 206 may be molded cylinders that are subsequently welded between the upper and lower layers 116, 118. The permanent bonding process, such as brazing or welding, integrally connects the upper and lower layers 116, 118 to the necks 206, resulting in a unitary, one-piece meta-structure 102 (comparable to forming the entire meta-structure 102 during a common additive manufacturing process).

The first elastic membrane 104 may be bonded to the distal edges 132 of the partition walls 122 to mount the membrane 104 to the upper layer 116. The elastic membrane 104 covers the outer end 128 of the resonance cavity 126 to seal the resonance cavity 126. The elastic membrane 104 may bond to the distal edges 132 using an adhesive, such as an epoxy. The second elastic membrane 106 may be similarly bonded to the distal edges 212 of the partition walls 208 to mount the membrane 106 to the lower layer 118. Although the first and second elastic membranes 104, 106 are shown in FIG. 3 as hexagonal discs with sizes that correspond to the diameters of the cells 124, 204 of the unit module 202, the illustrated hexagonal discs may be merely segments of larger membranes 104, 106 that align with the unit module 202. For example, as shown in FIG. 1, the elastic membranes 104, 106 may cover an entire area of the meta-structure 102.

The partition walls 122 of the cells 124 in the upper layer 116 are sized to have a length 216 within a designated range. The length 216 is the dimension extending across the given partition wall 122 between the two corners 214 that connect that partition wall 122 to adjacent partition walls 122. In one or more embodiments, the length 216 of the partition wall 122 is between about 1 mm and about 6 mm. In an embodiment, all of the partition walls 122 of the upper layer 116 have approximately the same length 216. As used herein, terms modifying a value representative of a measurement, such as "approximately" and "about" means that the measurement is inclusive of the stated value as well as values above and below the stated value within a designated threshold range, which may be 1%, 3%, or 5% of the stated value. For example, deviations in dimensions may result from variability in production and processing, and such deviations are considered within the scope of the specified ranges disclosed herein. The length 216 of the partition walls 122 may affect the sound absorbing qualities of the composite panel 100 (FIG. 1). Because the cell 204 of the lower layer 118 is a mirrored replica of the cell 124, the partition walls 208 of the cell 204 may have the same dimensions (e.g., including length) as the partition walls 122 of the cell 124.

Figure 4:
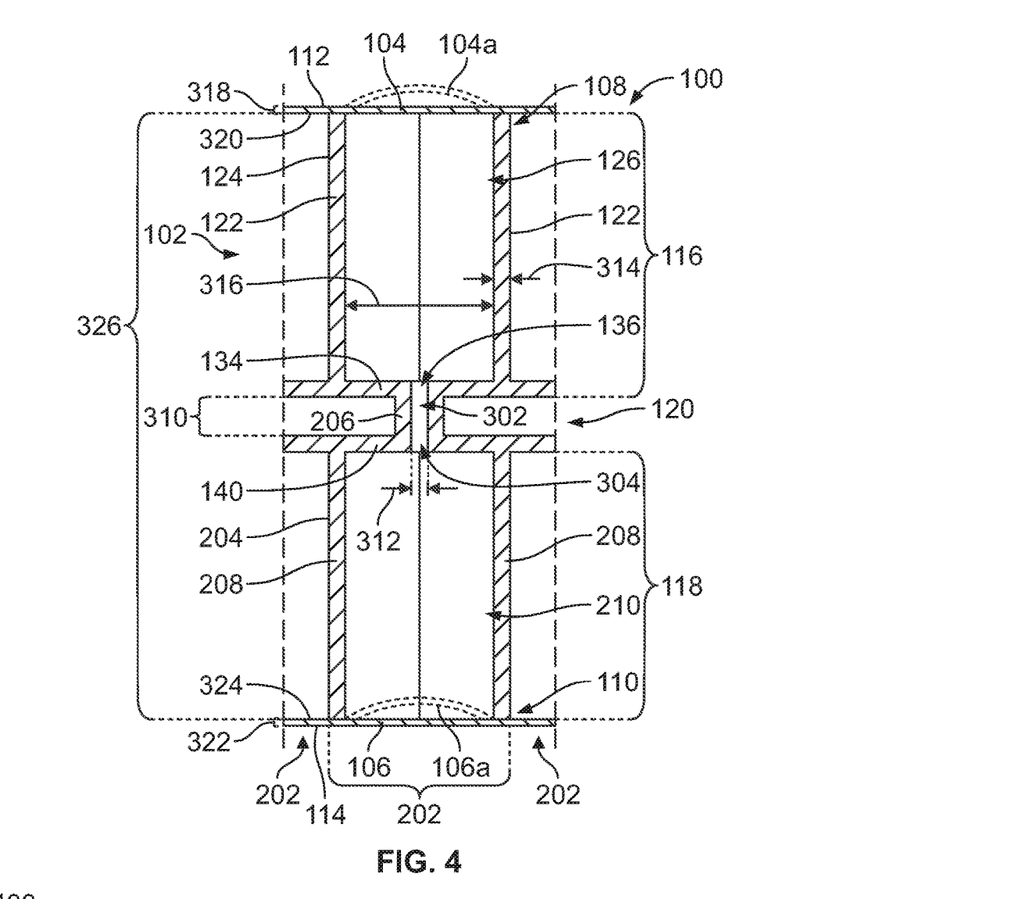
FIG. 4 is a transverse cross-sectional view of a portion of the composite panel assembly according to an embodiment of the present disclosure.

FIG. 4 is a transverse cross-sectional view of a portion of the composite panel 100 according to an embodiment. The illustrated portion shows one full unit module 202 of the acoustic meta-structure 102 and small segments of adjacent unit modules 202. The neck 206 of the meta-structure 102 is hollow and defines a channel 302 through the neck 206. The channel 302 is fluidly connected to both of the resonance cavities 126, 210 at the ends of the neck 206. For example, the channel 302 is fluidly connected to the resonance cavity 126 in the upper cell 124 through the orifice 136 in the base wall 134. The channel 302 is fluidly connected to the resonance cavity 210 in the lower cell 204 through an orifice 304 in the base wall 140. The channel 302 provides a fluid path across the intermediate space 120 between the two resonance cavities 126, 210. The channel 302 has a smaller diameter than the diameters of the two resonance cavities 126, 210. The meta-structure 102 is configured to function as a dual Helmholtz resonator based on the narrow channel 302 that connects two larger cavities 126, 210.

The first and second elastic membranes 104, 106 are configured to oscillate (e.g., vibrate) relative to the meta-structure 102 in response to pressure fluctuations. For example, the membranes 104, 106 each move reciprocally outwards (e.g., away from the neck 206) and inwards (e.g., towards the neck 206). When vibrating at certain frequencies, the first and second membranes 104, 106 may have in-phase displacement, and the first and second membranes 104, 106 may have out-of-phase displacement at other frequencies. The illustrated embodiment shows an example of in-phase displacement of the membranes 104, 106 in phantom. The phantom displacement 104a of the first elastic membrane 104 bulges outward away from the hexagonal resonance cavity 126 and the phantom displacement 106a of the second elastic membrane 106 bends inward into the hexagonal resonance cavity 210.

The partition walls 122, 208 of the meta-structure 102 may also be configured to bend, flex, and/or twist in response to pressure fluctuations. For example, the movement of the partition walls 122 of the upper honeycomb layer 116 may transfer vibrational energy between adjacent hexagonal resonance cavities 126, and the movement of the partition walls 208 of the lower honeycomb layer 118 may transfer vibrational energy between adjacent hexagonal resonance cavities 210.

The physical parameters of the composite panel 100 affect the sound-absorbance or sound transmission loss of the composite panel 100, including the magnitude of sound transmission loss and the frequency ranges that are absorbed. The parameters of the meta-structure 102 and the membranes 104, 106 can be customized in order to tune the composite panel 100 for desired sound-absorbing properties as well as for desired applications (e.g., as a film or a tile). The ranges of various parameters presented below are non-limiting example ranges only.

For example, the neck 206 has a height 310 extending from the upper honeycomb layer 116 to the lower honeycomb layer 118 that is between about 0.2 mm and about 2 mm. The channel 302 of the neck 206 has a diameter 312 that is also between about 0.2 mm and about 2 mm. The partition walls 122 of the upper honeycomb layer 116 may have a thickness 314 that is also between about 0.2 mm and about 2 mm. The hexagonal resonance cavities 126 have a diameter 316 defined between parallel, opposing partition walls 122 that may be between about 3 mm and about 12 mm. The partition walls 208 of the lower honeycomb layer 118 may have the same thickness 314 as the partition walls 122. The hexagonal resonance cavities 210 of the lower honeycomb layer 118 may have the same diameter 316 as the cavities 126. The base walls 134, 140 of the meta-structure 102 may have the same or similar thicknesses as the partition walls 122, 208.

In one non-limiting example, the height 310 of the neck 206 is about 1 mm, the diameter 312 of the channel 302 is about 0.5 mm, the thickness 314 of the partition walls 122, 208 is about 0.5 mm, and the diameter 316 of the resonance cavities 126, 210 is about 7 mm.

The first elastic membrane 104 has a thickness 318 defined between the exterior surface 112 and an interior surface 320 of the membrane 104 that is opposite to the exterior surface 112. The thickness 318 may be between about 0.1 mm and about 2 mm. The second elastic membrane 106 has a thickness 322 defined between the exterior surface 114 and an interior surface 324 of the membrane 106. The second elastic membrane 106 may be identical or at least substantially similar to the first elastic membrane 104, such that the thickness 322 may be the same as the thickness 318. In a non-limiting example, the thicknesses 318, 322 of the membranes 104, 106 are about 0.25 mm.

The meta-structure 102 has a height 326 that extends from the top side 108 to the bottom side 110. The height 326 is the cumulative sum of the respective heights of the partition walls 122 and 208, the respective thicknesses of the base walls 134 and 140, and the height 310 of the neck 206. The height 326 of the meta-structure 102 may be between about 4 mm and about 30 mm. In a non-limiting example, the height 326 is about 24 mm, but the meta-structure 102 may be formed to have different height parameters based on the application of the composite panel 100. For example, the meta-structure 102 may have a condensed height of around 8 mm or less (e.g., when the composite panel 100 is implemented as a thin film-like sheet). In other embodiments, the height may be greater (e.g., when the composite panel 100 is implemented as a tile or a self-supported wall panel).

In one experimental example, a composite sound-absorbing panel was constructed according to the embodiments shown in FIGS. 1-4, and the panel was experimentally tested to determine sound-absorbing performance of the panel. In the experimental example, the meta-structure of the composite panel was composed of a polyamide material, and the two elastic membranes were composed of natural rubber. The two elastic membranes each had a thickness of 0.25 mm. The meta-structure had a height between the two membranes of 24 mm. The side length of the partition walls was 3.5 mm, and the thickness of the partition walls was 0.5 mm. The height of the necks between the upper and lower honeycomb layers was 1 mm. The diameter of the channels of the necks was 0.5 mm. The diameter of the hexagonal resonance cavities was 7 mm.

The sound transmission loss (STL) of the composite panel was measured using a standardized impedance tube test. The composite panel had an average STL of 57 dB in a low frequency range of 25-500 Hz. The low frequency range may be experienced by a passenger within an interior cabin of an aircraft, for example. The results indicate that the composite panel provides better sound dampening in the low frequency range than known sound-absorbing materials. Throughout a larger frequency range of 25-1600 Hz, the composite panel had a measured average STL of 37 dB. The resonant frequencies were observed at 708 Hz and 1168 Hz, and the absorption coefficients at these resonant frequencies were 0.78 and 0.91.

Simulations of the composite panel were also performed. The simulations indicated that sound attenuation is accomplished by vibration of the membranes relative to the meta-structure, and also by inter-cavity coupling of vibrational energy due to bending and flexing of the partition walls. The simulations estimated that the composite panel has a negative effective bulk modulus in the frequency range of 1105 to 1545 Hz. The negative effective bulk modulus may be due to monopolar resonance created by the Helmholtz resonator of the meta-structure and out-of-phase movement of the first and second elastic membranes. The simulations also estimated that the composite panel has a negative effective dynamic mass in a frequency range of 745 to 1525 Hz. The negative effective dynamic mass may be due to dipolar resonance created by the in-phase movement of the membranes. Thus, the simulations estimated that there is a double negative region where the two frequency ranges overlap, which in this case is between 1105 Hz and 1525 Hz. The double negative region is indicative of a combination of both in-phase and out-of-phase movement of the elastic membranes.

It was determined through experimental testing and simulation that the height of the meta-structure has little effect on the sound absorbance properties of the composite panel. Therefore, the height of the composite panel can be customized based on the application without significantly affecting the performance of the panel.

Figure 5:
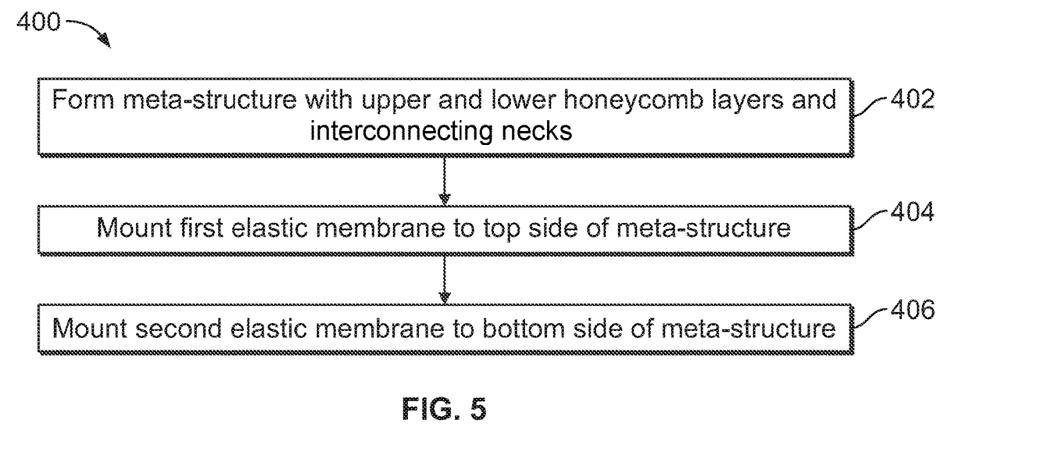
FIG. 5 is a flow chart of a method for producing a composite sound-absorbing panel assembly according to an embodiment of the present disclosure.

FIG. 5 is a flow chart of a method 400 for producing a composite sound-absorbing panel according to an embodiment. The composite sound-absorbing panel produced by the method 400 may be installed within an interior cabin of a vehicle to provide noise dampening, or may be installed proximate to a noise emitter, such as an engine of a vehicle. The composite sound-absorbing panel may also be installed outside of vehicles, such as in factories or homes. The method 400 may produce one or more of the embodiments of the composite panel 100 shown in FIGS. 1-4.

At 402, an acoustic meta-structure is formed. The acoustic meta-structure may be formed via an additive manufacturing process, but is not limited to formation via additive manufacturing. The additive manufacturing process may be 3D printing, selective laser sintering, fused deposition modeling, or the like. The meta-structure may be formed using a polymeric material, such as polyamide or the like. The meta-structure is formed to have a specific architecture. For example, the meta-structure includes an upper honeycomb layer and a lower honeycomb layer. Each of the honeycomb layers is a lattice that includes partition walls that define resonance cavities between the partition walls. For example, in one or more embodiments, the resonance cavities of the upper and lower honeycomb layers have hexagonal cross-sections, such that each resonance cavity is defined between six partition walls. The upper and lower honeycomb layers each include a respective base wall from which the partition walls extend. Each partition wall extends from the base wall to a distal edge of the partition wall. The upper and lower honeycomb layers mirror each other such that the base walls are proximate to each other, the distal edges of the partition walls of the upper honeycomb layer define a top side of the meta-structure, and the distal edges of the partition walls of the lower honeycomb layer define a bottom side of the meta-structure. Each of the resonance cavities extends from an inner end at the respective base wall to an outer end at the distal edges of the respective partition walls.

The necks are disposed between the upper and lower honeycomb layers. The necks extend between and connect the base walls of the upper and lower honeycomb layers. The upper honeycomb layer is connected to the lower honeycomb layer through the necks. The necks define channels that have smaller diameters than the resonance cavities. Each of the channels fluidly connects one of the resonance cavities of the upper honeycomb layer to one of the resonance cavities of the lower honeycomb layer. For example, the channels of the necks align with orifices in the base walls to provide the fluid connection between the resonance cavities. The additive manufacturing process may form the upper honeycomb layer, the necks, and the lower honeycomb layer during a common formation process such that all three sections of the meta-structure are integrally formed and integrally connected to one another.

At 404, a first elastic membrane is mounted to the top side of the meta-structure. The elastic membrane may be a thin sheet composed of a rubber material, a metal material, a composite material, or the like. The elastic membrane may be mounted to the top side by bonding the elastic membrane to the distal edges of the partition walls of the upper honeycomb layer. The elastic membrane may be bonded to the partition walls using an adhesive, such as a thermally-curable epoxy. For example, the mounting operation may be accomplished by applying the thermally-curable epoxy to the distal edges of the partition walls while the epoxy is in a flowable state, then positioning the elastic membrane on the distal edges of the partition walls. Next, the assembly is heated to cure or set the epoxy, which provides a permanent bond between the membrane and the distal edges of the partition walls. As an alternative to using an adhesive, the elastic membrane may be bonded to the partition walls via brazing, welding, or the like, such as when the elastic membrane is a thin metallic sheet. When the first elastic membrane is mounted to the top side, the membrane covers and seals the outer ends of the resonance cavities of the upper honeycomb layer.

At 406, a second elastic membrane is mounted to the bottom side of the meta-structure. The second elastic membrane may be identical or at least substantially similar to the first elastic membrane. The second elastic membrane may be mounted to the distal edges of the partition walls of the lower honeycomb layer in the same or a similar way that the first elastic membrane is mounted to the upper honeycomb layer, such as via a thermally-curable epoxy or another adhesive. When mounted to the bottom side, the second elastic membrane covers and seals the outer ends of the resonance cavities of the lower honeycomb layer.

In an alternative embodiment for producing the composite sound-absorbing panel, the meta-structure may be formed by molding or additively manufacturing individual cells defining a single resonance cavity. The cells are subsequently secured to one another side-by-side to define a cell lattice similar to each of the upper and lower honeycomb layers. Thus, each of the upper and lower honeycomb layers can be produced as assemblies of multiple identical sub-units instead of being unitary structures integrally-formed during a single additive manufacturing process.

Figure 6:
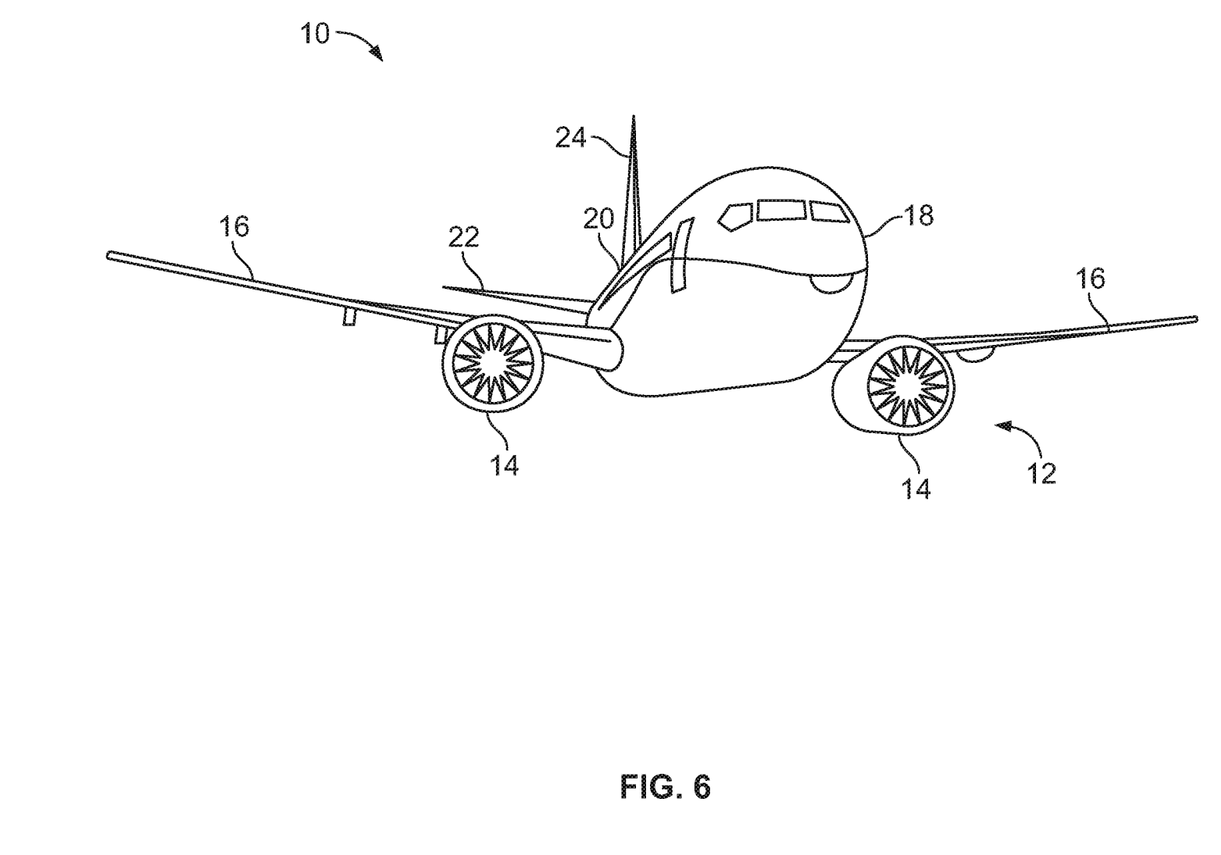
FIG. 6 illustrates a front perspective view of an aircraft according to an embodiment of the present disclosure.

FIG. 6 illustrates a front perspective view of an aircraft 10 according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24. The fuselage 18 of the aircraft 10 defines an interior cabin.

Figure 7:
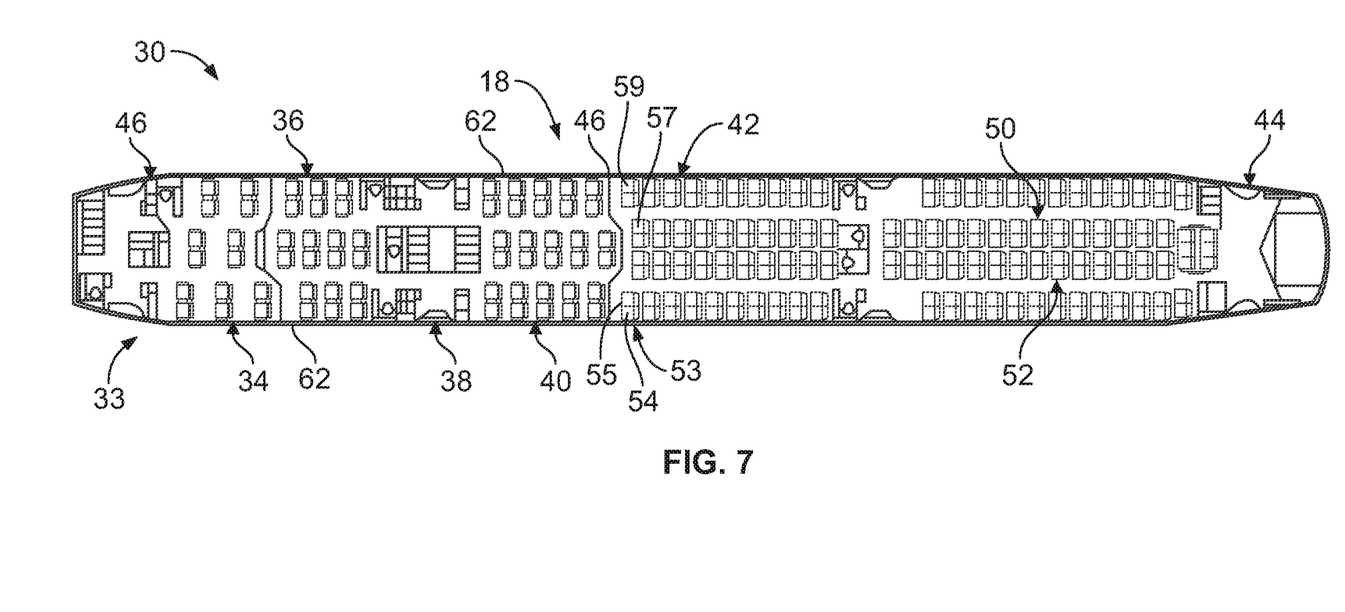
FIG. 7 illustrates a top plan view of an interior cabin of the aircraft of FIG. 6.

FIG. 7 illustrates a top plan view of an interior cabin 30 of the aircraft 10 (shown in FIG. 6) according to an embodiment of the present disclosure. The interior cabin 30 is within the fuselage 18. For example, one or more fuselage wall members 62 may define the interior cabin 30. The interior cabin 30 includes multiple sections or zones, including a front section 33, a first class section 34, a business class section 36, a front galley station 38, a business section 40 (e.g., an expanded economy or coach section), a standard economy or coach section 42, and an aft section 44, which may include multiple lavatories and galley stations. It is to be understood that the interior cabin 30 may include more or less sections and zones than shown. For example, the interior cabin 30 may not include a first class section, and may include more or less galley stations than shown. Each of the sections may be separated by a cabin transition area 46, which may include class divider assemblies. Overhead stowage bin assemblies may be positioned throughout the interior cabin 30.

As shown in FIG. 7, the interior cabin 30 includes two aisles 50 and 52 that lead to the aft section 44. Optionally, the interior cabin 30 may have less or more aisles than shown. For example, the interior cabin 30 may include a single aisle that extends through the center of the interior cabin 30 that leads to the aft section 44. The interior cabin 30 includes rows 53 of seats 54 that span across the interior cabin 30 and generally extend across the aisles 50 and 52. Columns 55, 57, and 59 of seat sections extend perpendicular to the rows 53. Each seat section may include one or more seats 54. The columns 55, 57, and 59 generally run parallel with the aisles 50 and 52. A particular section or zone may include any number of columns 55, 57, and 59 of seat sections. As shown in FIG. 7, at least one zone includes three columns 55, 57, and 59 of seat sections. However, each zone may include more or less than three columns.

The interior cabin 30 may include composite sound-absorbing panels formed according to one or more of the embodiments described herein. The composite sound-absorbing panels may be mounted along the fuselage wall members 62. Additionally, or alternatively, the composite sound-absorbing panels may be positioned proximate to the engines 14 (shown in FIG. 6) to shield the interior cabin 30 from the engine noise. The composite sound-absorbing panels may be configured to absorb and attenuate low-frequency noise to reduce the level of engine noise within the interior cabin 30.

Alternatively, instead of an aircraft, embodiments of the composite sound-absorbing panels may be used with various other vehicles, such as automobiles, buses, locomotives and train cars, seacraft, spacecraft, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person of ordinary skill in the art to practice the various embodiments of the disclosure, including making and using any devices or systems and performing any incorporated methods. The patentable scope of the various embodiments of the disclosure is defined by the claims, and may include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A composite panel assembly comprising:
   first and second elastic membranes; and
   a structure having a first side and a second side that is opposite the first side, the first side mounted to the first elastic membrane, the second side mounted to the second elastic membrane, the structure comprising:
     a first honeycomb layer with partition walls defining resonance cavities, the resonance cavities of the first honeycomb layer covered by the first elastic membrane along the first side of the structure;
     a second honeycomb layer with partition walls defining resonance cavities, the resonance cavities of the second honeycomb layer covered by the second elastic membrane along the second side of the structure, wherein each of the first honeycomb layer and the second honeycomb layer includes a respective base wall that defines inner ends of the respective resonance cavities, the base wall of the first honeycomb layer spaced apart from the base wall of the second honeycomb layer; and
     a plurality of necks disposed between and connecting the respective base walls of the first and second honeycomb layers, each neck defining a respective channel that is fluidly connected to a corresponding one of the resonance cavities of the first honeycomb layer and a corresponding one of the resonance cavities of the second honeycomb layer.

2. The composite panel assembly of claim 1, wherein the resonance cavities of the first and second honeycomb layers are hexagonal cavities that are each defined by six of the partition walls.

3. The composite panel assembly of claim 2, wherein each of the partition walls of the first and second honeycomb layers has a length extending between adjacent partition walls on either side of the partition wall, the length of each partition wall being between about 1 mm and about 6 mm.

4. The composite panel assembly of claim 1, wherein the first elastic membrane is bonded to the partition walls of the first honeycomb layer to seal outer ends of the resonance cavities thereof, and the second elastic membrane is bonded to the partition walls of the second honeycomb layer to seal outer ends of the resonance cavities thereof.

5. The composite panel assembly of claim 1, wherein the first and second elastic membranes each have an interior surface that engages the structure and an exterior surface that faces away from the structure, the first and second elastic membranes each having a thickness between the respective interior and exterior surfaces that is between about 0.1 mm and about 1.0 mm.

6. The composite panel assembly of claim 1, wherein the channels of the necks have smaller diameters than the resonance cavities of the first and second honeycomb layers.

7. The composite panel assembly of claim 1, wherein each of the base walls defines orifices therethrough that align with the channels of the necks to fluidly connect the resonance cavities of the first honeycomb layer to the resonance cavities of the second honeycomb layer through the channels.

8. The composite panel assembly of claim 1, wherein the necks each have a height between the first honeycomb layer and the second honeycomb layer that is between about 0.2 mm and about 2 mm.

9. The composite panel assembly of claim 1, wherein the structure has a height between the first side and the second side that is between about 5 mm and about 30 mm.

10. The composite panel assembly of claim 1, wherein the structure comprises a polymeric material and the first and second elastic membranes comprise a rubber material.

11. The composite panel assembly of claim 1, wherein the first honeycomb layer of the structure is integrally connected to the second honeycomb layer via the necks.

12. A method comprising:
    forming a structure having a first side and a second side that is opposite the first side, the structure including a first honeycomb layer with partition walls defining resonance cavities, a second honeycomb layer with partition walls defining resonance cavities, and a plurality of necks, wherein each of the first and second honeycomb layers includes a respective base wall that defines inner ends of the respective resonance cavities, the base wall of the first honeycomb layer spaced apart from the base wall of the second honeycomb layer, the necks disposed between and connecting the respective base walls of the first and second honeycomb layers, each neck defining a channel that is fluidly connected to a corresponding one of the resonance cavities of the first honeycomb layer and a corresponding one of the resonance cavities of the second honeycomb layer;

mounting a first elastic membrane to the first side of the structure, the first elastic membrane covering outer ends of the resonance cavities of the first honeycomb layer; and mounting a second elastic membrane to the second side of the structure, the second elastic membrane covering outer ends of the resonance cavities of the second honeycomb layer.

13. The method of claim 12, wherein the partition walls of the first honeycomb layer have distal edges that define the first side of the structure and the partition walls of the second honeycomb layer have distal edges that define the second side of the structure, wherein mounting the first elastic membrane includes bonding the first elastic membrane to the distal edges of the partition walls of the first honeycomb layer, and mounting the second elastic membrane includes bonding the second elastic membrane to the distal edges of the partition walls of the second honeycomb layer.

14. The method of claim 12, wherein the resonance cavities of both the first honeycomb layer and the second honeycomb layer have hexagonal cross-sections defined by six of the respective partition walls.

15. The method of claim 12, wherein mounting the first elastic membrane includes bonding the first elastic membrane to the first side of the structure using a thermally-curable epoxy, and mounting the second elastic membrane includes bonding the second elastic membrane to the second side of the structure using the thermally-curable epoxy.

16. The method of claim 12, wherein forming the structure includes forming the channels of the necks to have smaller diameters than the resonance cavities of the first and second honeycomb layers.

17. A composite panel assembly comprising:
a structure comprised of multiple unit modules disposed side by side, each of the unit modules comprising:
a first base wall and multiple first partition walls extending from the first base wall to define a first resonance cavity, the first base wall defining an inner end of the first resonance cavity;
a second base wall and multiple second partition walls extending from the second base wall to define a second resonance cavity, the second base wall defining an inner end of the second resonance cavity, the second base wall spaced apart from the first base wall; and
a neck extending between and connecting the first and second base walls, the neck defining a channel therethrough that is fluidly connected to the first resonance cavity through an orifice in the first base wall and is fluidly connected to the second resonance cavity through an orifice in the second base wall.

18. The composite panel assembly of claim 17, further comprising a first elastic membrane engaging distal edges of the first partition walls and covering an outer end of the first resonance cavity that is opposite the inner end thereof, and a second elastic membrane engaging distal edges of the second partition walls and covering an outer end of the second resonance cavity that is opposite the inner end thereof.

19. The composite panel assembly of claim 17, wherein the first resonance cavity has a hexagonal cross-sectional shape defined by six of the first partition walls, and the second resonance cavity has a hexagonal cross-sectional shape defined by six of the second partition walls.

20. The composite panel assembly of claim 17, wherein adjacent unit modules of the structure are integrally connected to one another.

\* \* \* \* \*